United States Patent [19]
Britzke et al.

[11] Patent Number: 5,609,447
[45] Date of Patent: Mar. 11, 1997

[54] SURFACE DECARBURIZATION OF A DRILL BIT

[75] Inventors: Robert W. Britzke; Jimmy Eason, both of Rogers, Ark.; Zhigang Fang, The Woodlands, Tex.

[73] Assignee: Rogers Tool Works, Inc., Rogers, Ark.

[21] Appl. No.: 314,510

[22] Filed: Sep. 28, 1994

Related U.S. Application Data

[63] Continuation-in-part of Ser. No. 151,800, Nov. 15, 1993, abandoned.

[51] Int. Cl.$^6$ ............................................. B23B 51/02
[52] U.S. Cl. ................................. 408/230; 408/144
[58] Field of Search ............................ 408/144, 227, 408/230

[56] References Cited

U.S. PATENT DOCUMENTS

| | | |
|---|---|---|
| 451,896 | 5/1891 | Merritt .................................. 408/230 |
| 2,966,081 | 12/1960 | Kallio .................................... 408/230 |
| 3,387,511 | 6/1968 | Ackart, Sr. et al. ................. 408/230 |
| 3,525,610 | 8/1970 | Meadows . |
| 3,912,414 | 10/1975 | Fukura et al. . |
| 4,116,580 | 9/1978 | Hall . |
| 4,222,690 | 9/1980 | Hosoi . |
| 4,381,162 | 4/1983 | Hosoi . |
| 4,561,813 | 12/1985 | Schneider . |
| 4,583,888 | 4/1986 | Mori et al. ............................. 408/144 |
| 4,602,900 | 7/1986 | Arpaio, Jr. et al. . |
| 4,605,347 | 8/1986 | Jodock et al. . |
| 4,642,003 | 2/1987 | Yoshimura . |
| 4,642,942 | 2/1987 | Guhring . |
| 4,646,479 | 3/1987 | Walker et al. . |
| 4,688,972 | 8/1987 | Kubota . |
| 4,712,948 | 12/1987 | Kidani . |
| 4,744,705 | 5/1988 | Imanaga . |
| 4,759,667 | 7/1988 | Brown . |
| 4,789,276 | 12/1988 | Clarke . |
| 4,826,368 | 5/1989 | Tikal et al. . |
| 4,898,503 | 2/1990 | Barish . |
| 4,983,079 | 1/1991 | Imanaga et al. . |
| 5,004,384 | 4/1991 | Hosoi . |
| 5,011,342 | 4/1991 | Hsu et al. . |

(List continued on next page.)

FOREIGN PATENT DOCUMENTS

| | | | |
|---|---|---|---|
| 3936747 | 5/1991 | Germany ............................ 408/230 |
| 31536 | 3/1980 | Japan .................................. 408/230 |
| 57-071714 | 5/1982 | Japan . |
| 166405 | 9/1984 | Japan .................................. 408/230 |
| 92019 | 4/1989 | Japan .................................. 408/230 |
| 1678532 | 9/1991 | Russian Federation . |
| 306966 | 1/1930 | United Kingdom ................. 408/230 |

OTHER PUBLICATIONS

Sidney H. Avner, Introduction to Physical Metallurgy, pp. 129–137, 415–421, 625–631 (1974).
Modern Machine Shop, Jun. 1989, Mazoff, J., "Choose the Best Drill Point Geometry", pp. 66–67.

*Primary Examiner*—Daniel W. Howell
*Attorney, Agent, or Firm*—Dickstein, Shapiro, Morin & Oshinsky LLP

[57] ABSTRACT

A drill but having a drill body with a cutting tip, an axis of symmetry, and a plurality of flutes wherein said flutes have a rake surface at said cutting tip. The cutting tip includes a plurality of side blades between said flutes and joined at a web, a plurality of flank surfaces extending from an outer diameter of said cutting tip to said axis of symmetry, and a plurality of primary cutting edges at the intersection of said flank surfaces with said rake surfaces. Both the rake and flank surfaces have extensions which would intersect each other at an intersection. The primary cutting edges include an angular surface formed on the forward end of said rake surfaces which is located such that the length of said extension of said rake surface measured between said angular surface and said intersection is a first predetermined value and the length of said extension of said flank surface measured between said angular surface and said intersection is a second predetermined value. The primary cutting edges also have a hardened layer formed from the outer surface of the primary cutting edge.

10 Claims, 3 Drawing Sheets

U.S. PATENT DOCUMENTS 5,035,552 7/1991 Lysenko et al. .
5,038,641 8/1991 Shen et al. .
5,088,863 2/1992 Imanaga et al. .
5,181,811 1/1993 Hosoi .
5,186,739 2/1993 Isobe et al. .
5,230,593 7/1993 Imanaga et al. .
5,231,802 8/1993 Hosoi .

SURFACE DECARBURIZATION OF A DRILL BIT

This application is a continuation-in-part of U.S. application Ser. No. 08/151,800 filed on Nov. 15, 1993, now abandoned.

BACKGROUND OF THE INVENTION

The present invention relates generally to a drill bit and a method of surface decarburizing same and more particularly to a cemented carbide microdrill having refined primary cutting edges and a method of surface decarburizing same.

Microdrills generally range in diameter from about 0.002 inches to 0.125 inches. Microdrills are typically employed to form holes in single sided, double sided, and multilayer printed circuit board laminates. Microdrills may additionally be employed in any application where small holes of carefully controlled dimensions are required. Such additional applications include cameras, watches, fuel injectors and the like.

High quality holes of precise dimensions are required in printed circuit boards and other applications. This requires producing holes with minimal defects such as rough hole walls and burrs. These undesirable defects may be caused by chipped or worn drill bits. These problems and the accompanying need to reduce chipping and wear have been recognized previously. See U.S. Pat. No. 4,759,667 issued to Brown, and U.S. Pat. No. 4,561,813 issued to Schneider.

Microdrills for drilling holes in printed circuit boards must have sufficient strength and resistance to wear to satisfy the requirements of the industry. Accordingly, it is common to make such microdrills of cemented carbide to provide the strength and hardness required. A disadvantage of using cemented carbide, however, is its brittleness which causes such microdrills to be prone to chipping. This is especially so at the outer corner of the cutting edge of the drill bit which defines the wall of the hole drilled in the printed circuit board. This proneness to chipping of cemented carbide drills has been recognized previously. See U.S. Pat. No. 4,583,888 issued to Mori, et al., and U.S. Pat. No. 4,642,003 issued to Yoshimura.

To improve drill bit life, conventional processes have focused on heat treating the entire tool (surface and interior portion), rather than the surface. Others have also heat treated or annealed the sintered powder used in forming the drill bit rather than the finished tool in an attempt to extend drill bit life.

Attempts at improving resistance to wear and chipping of cemented carbide microdrills for printed circuit boards and other drills have been tried. Yet a superior microdrill of cemented carbide which is resistant to wear and chipping and which can be economically mass produced has not emerged.

SUMMARY OF THE INVENTION

The present invention alleviates to a great extent the disadvantages of the prior art by providing a cemented carbide microdrill that is chip and wear resistant, and a method of surface decarburizing same to make the microdrill more chip and wear resistant.

In one aspect of the invention, a process of surface decarburizing a cemented carbide microdrill to increase resistance to wear and chipping is provided.

In another aspect of the invention, a process of surface decarburizing a cemented carbide microdrill is provided wherein the microdrill is surface hardened without hardening the interior of the microdrill below the hardened outer surface thereby providing a wear resistant layer.

In another aspect of the invention, a process of surface decarburizing a cemented carbide microdrill is provided in which a hardened outer surface layer is formed thereon that comprises eta phase, a double carbide of tungsten and cobalt, and tungsten carbide WC and cobalt metal.

In another aspect of the invention, the primary cutting edges of the microdrill are strengthened by refining the cutting edges by forming an angular surface ("K land") adjacent to the cutting edge.

It is another object of the present invention to provide a microdrill of cemented carbide for use in drilling holes in printed circuit boards with primary cutting edges which are refined and surface decarburized so as to be resistant to chipping and wear.

In another aspect of the invention, a process of surface decarburizing a drill bit is provided wherein the surface decarburizing is performed following a refining of the primary cutting edges by forming an angular surface thereon so as to increase tool life.

Other objects and advantages of the present invention will become readily apparent from the following description and drawings which illustrate preferred embodiments of the present invention.

DETAILED DESCRIPTION OF PREFERRED EMBODIMENTS

Cemented carbide microdrills are generally made by pressing and sintering a mixture of powders of one or more metallic carbides and a smaller amount of metal such as cobalt to serve as a binder. Cemented carbides have a very high hardness and strength which makes it an advantageous material to use in the drilling applications described above. However, cemented carbides are also brittle. This can lead to chipping, especially at the outer corners of the primary cutting edges.

The purpose of surface decarburizing microdrills is to increase resistance of the cemented carbide to wear and chipping. The surface decarburizing process obtains a thin (less than 1 micron) wear resistant layer that comprises eta phase (carbon deficient carbide), a double carbide of tungsten and cobalt, e.g., $Co_3W_3C$ or $Co_3W_6C$, as well as tungsten carbide WC and cobalt metal.

Surface decarburizing of the cemented carbide microdrill is done at a temperature from 600° C. to 1100° C. for 15 to 120 minutes. To achieve the desired phase composition, the surface decarburizing process requires a controlled partial pressure of decarburizing gas, e.g., hydrogen, carbon dioxide, oxygen and other mixtures, with hydrogen being preferred, amid the general protective environment at the heat treating temperature. Surface decarburizing is preferably done at approximately 800° C. for approximately 60 minutes in the mixture of decarburizing gas.

The above surface decarburizing process may also be advantageously used on microdrills having refined cutting edges to further increase resistance to wear and chipping. The refinements may be made, for example, by various known honing methods. These refinements to the primary cutting edge of the surface decarburized cemented carbide microdrill are discussed below.

Figure 1:
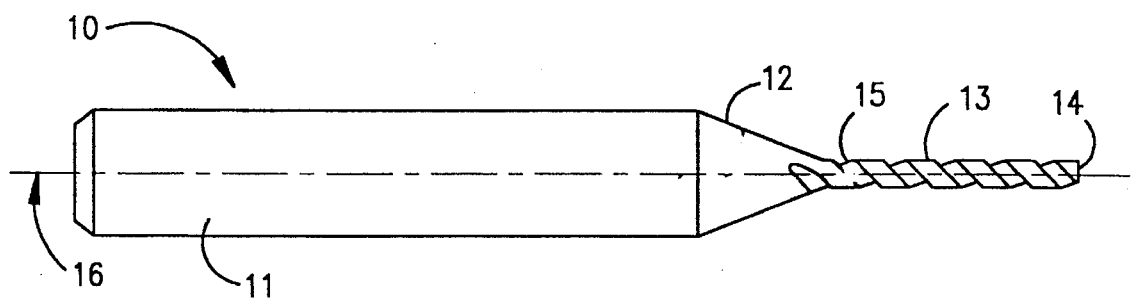
FIG. 1 is a side elevation of a microdrill according to the present invention.

Refer now to FIG. 1 which illustrates a side elevation of an embodiment of a microdrill according to the present invention. A microdrill is generally illustrated at 10 as comprising a shank 11, a tapered section 12, and a drill body 13. The drill body 13 may be provided with a slight inward taper toward the shank to provide clearance with respect to the wall of the hole being drilled. The drill body 13 comprises a cutting tip 14 and a plurality of flutes 15. The flutes extend from the cutting tip 14 and terminate in the tapered section 12. The wall of the flute at the primary cutting edge is defined by the rake surface 17. The microdrill has a longitudinal axis of symmetry 16. Wherever the elements of microdrill 10 are common to the embodiments described below, consistent numbering is used.

Figure 2:
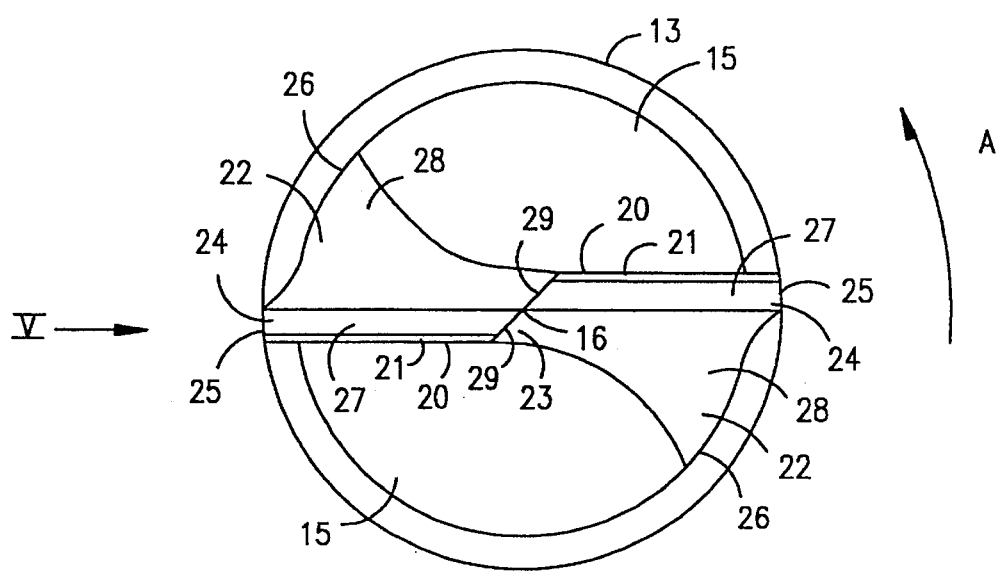
FIG. 2 is a view of the cutting tip of a first embodiment of a microdrill according to the present invention.
Figure 5A:
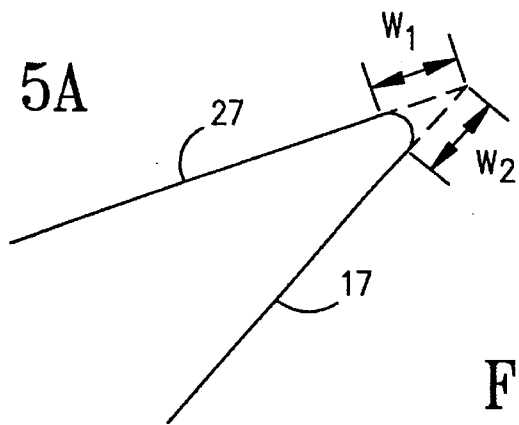
FIG. 5A is a view along direction V of the microdrill of FIG. 2.
Figure 5B:
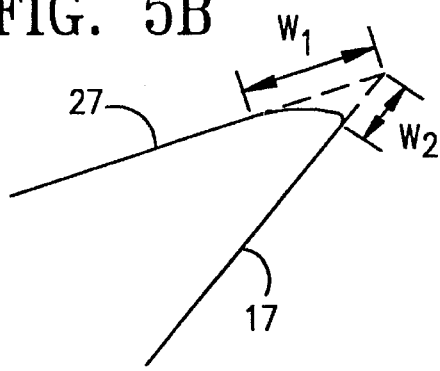
FIG. 5B is a view like FIG. 5A showing an alternate geometry.
Figure 5C:
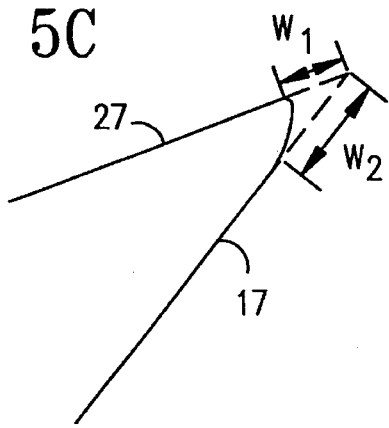
FIG. 5C is a view like FIG. 5A showing another alternate geometry.

Refer now to FIG. 2 which illustrates a view of the cutting tip of the first embodiment of a microdrill according to the present invention. The point end has primary cutting edges 20 formed at the intersection of the flank surfaces 27 with the rake surface 17. The primary cutting edges 20 have been refined by forming radius surfaces 21. The term radius surface is used throughout to indicate any curvilinear modification to the cutting edge, not limited to a true or constant radius. This configuration can best be seen in FIG. 5A which shows radius surface 21 formed at primary cutting edge 20 at the intersection of flank surface 27 and rake surface 17. Radius surface 21 extends from the forward end of the flank surface 27 to the rake surface 17. Radius surface 21 can extend along all or any portion of the primary cutting edge 20, preferably extending from the outer corner of primary cutting edge 20. The extent of the radius surface can vary from a slight polish to a heavy hone. FIG. 5B shows an alternate radius surface geometry having a curvilinear radius surface 21 with a "waterfall" on the flank surface 27. In FIG. 5C, the radius surface 21 has a waterfall on the rake surface 17. The distance W1 between an imaginary point where the flank surface 27 would intersect rake surface 17 and the point where the radius surface 21 intersects the flank surface 27 is at least about 0.0001 inches. The distance W2 between this imaginary point and the point where the radius surface 21 intersects the rake surface 17, is also at least about 0.0001 inches.

Returning to FIG. 2, the cutting tip additionally has side blades 22 which are formed between the flutes 15. The side blades 22 have a wing-shaped cross section and are connected together at axis 16 by the web 23. Side blades 22 spiral along the length of drill body 13 and have margins 24 at outer diameter 25. The portion of side blades 22 trailing margins 24 has reduced diameter 26 referred to as a side blade clearance diameter. Secondary surfaces 28 may be formed on the trailing edge of flank surfaces 27. In such a configuration, the intersection of chisel 28 with the opposite flank surface 27 forms secondary surface edge 29. In operation, the microdrill is rotated in direction A and thrust forward to the work piece. All cutting edges are leading edges with respect to that direction of rotation.

Figure 3:
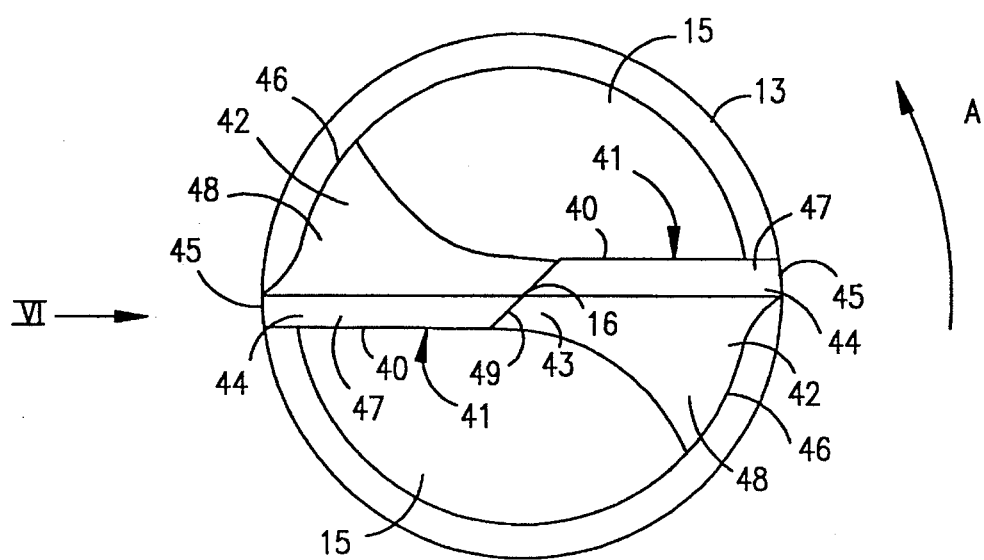
FIG. 3 is a view of the cutting tip of a second embodiment of a microdrill according to the present invention.
Figure 6:
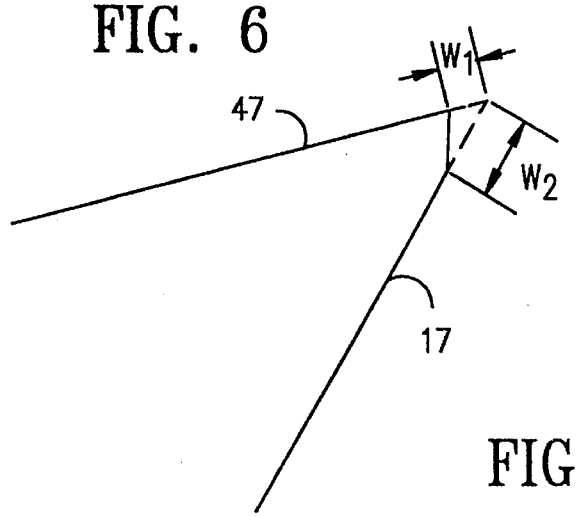
FIG. 6 is a view along direction VI of the microdrill of FIG. 3.

Refer now to FIG. 3 which illustrates a view of the cutting tip of a second embodiment of a microdrill according to the present invention. The point end has primary cutting edges 40 formed at the intersection of flank surfaces 47 with the rake surface 17. The primary cutting edges 40 have been refined by forming angular surfaces 41 ("K land"). This configuration can best be seen in FIG. 6 which shows angular surface 41 formed at the primary cutting edge 40 at the intersection of flank surface 47 and rake surface 17. Angular surface 41 is formed on the forward end of rake surface 17. Angular surface 41 can extend along all or a portion of primary cutting edge 40, preferably extending from the outer corner of the primary cutting edge 40. The distance W1 between an imaginary point where the flank surface 47 would intersect the rake surface 17 and the point where the angular surface 41 intersects the flank surface 47 is at least about 0.0001. The distance W2 between this imaginary point and the point where the angular surface 41 intersects the rake surface 17 is preferably at least about 0.0001 inches.

Returning to FIG. 3, the cutting tip additionally has side blades 42 which are formed between the flutes 15. The side blades 42 have a wing-shaped cross section and are connected together at axis 16 by the web 43. Side blades 42 spiral along the length of drill body 13 and have margins 44 at outer diameter 45. The portion of side blades 42 trailing margins 44 has reduced diameter 46 referred to as a side blade clearance diameter. Secondary surfaces 48 may be formed on the trailing edge of flank surfaces 47. In such a configuration, the intersection of chisel 48 with the opposite flank surface 47 forms secondary surface edge 49. In operation, the microdrill is rotated in direction A and thrust forward to the work piece. All cutting edges are leading edges with respect to that direction of rotation.

Figure 4:
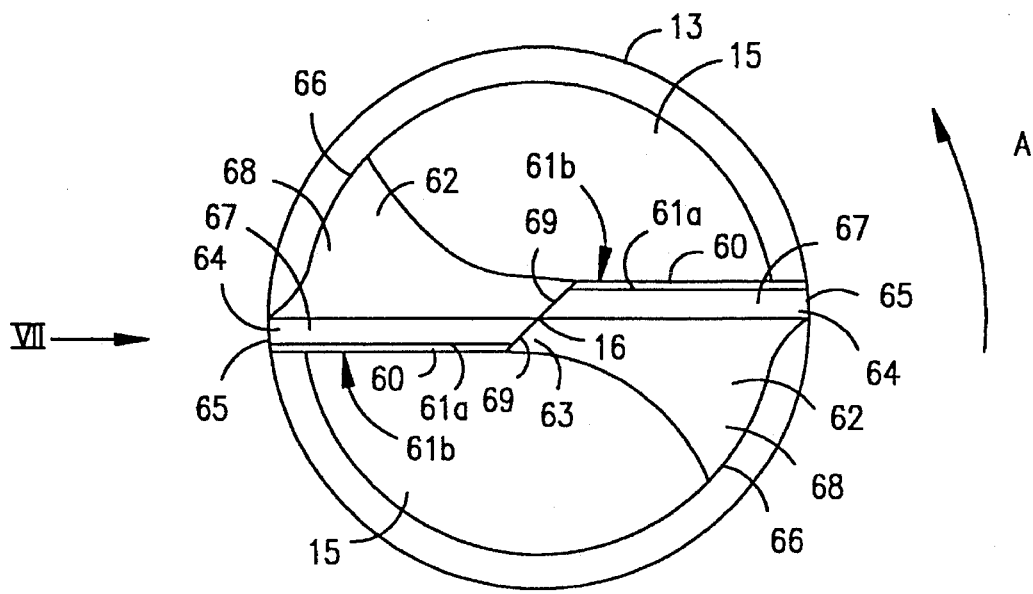
FIG. 4 is a view of the cutting tip of a third embodiment of a microdrill according to the present invention.
Figure 7A:
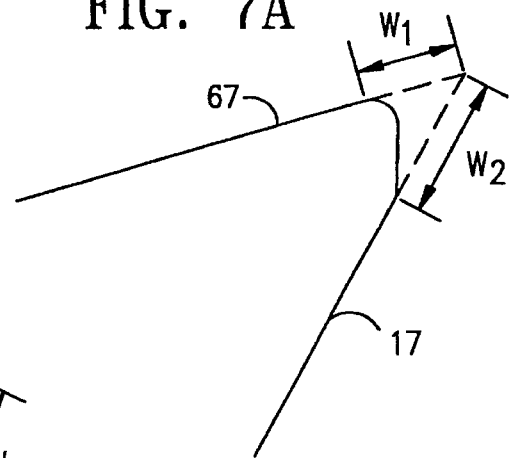
FIG. 7A is a view along direction VII of the microdrill of FIG. 4.
Figure 7B:
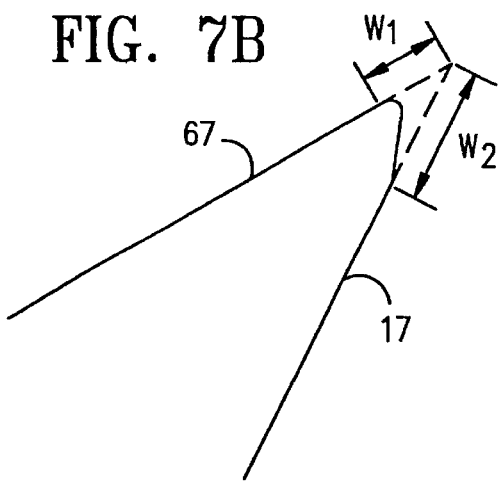
FIG. 7B is a view like FIG. 7A showing an alternate geometry.
Figure 7C:
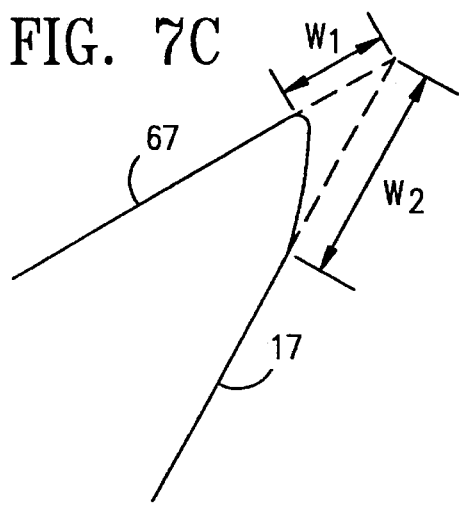
FIG. 7C is a view like FIG. 7A showing another alternate geometry.

Refer now to FIG. 4 which illustrates a view of the cutting tip of a third embodiment of a microdrill according to the present invention. The point end has primary cutting edges 60 formed at the intersection of flank surfaces 67 with the rake surface 17. The primary cutting edges 60 have been refined by forming radius surfaces 61a and angular surfaces 61b. This configuration can best be seen in FIG. 7A which shows radius surface 61a and angular surface 61b formed at the primary cutting edge 60. Angular surface 61b is formed at the forward end of rake surface 17. Radius surface 61a extends from the forward end of the angular surface 61b to the flank surface 67. Angular surface 61b and radius surface 61a may extend along all or any portion of primary cutting edge 60, preferably extending from the outer corner of cutting edge 60. FIG. 7B shows an alternate geometry in which the radius surface 61a is a curvilinear surface having a waterfall on the flank surface 67. In FIG. 7C, the radius surface has a waterfall on the angular surface 61b. The distance W1 between an imaginary point where the flank surface 67 would intersect the rake surface 17 and the point where the radius surface 61a intersects the flank surface 67 is preferably at least 0.0001 inches. The distance W2 between this imaginary point and the point where the angular surface 61b intersects the rake surface 17 is preferably at least 0.0001 inches.

Returning to FIG. 4, the cutting tip additionally has side blades 62 which are formed between the flutes 15. The side blades 62 have a wing-shaped cross section and are connected together at axis 16 by the web 63. Side blades 62 spiral along the length of drill body 13 and have margins 44 at outer diameter 65. The portion of side blades 62 trailing margins 64 has reduced diameter 66 referred to as a side blade clearance diameter. Secondary surfaces 68 may be formed on the trailing edge of flank surfaces 67. In such a configuration, the intersection of secondary surface 68 with the opposite flank surface 67 forms secondary surface edge 69. In operation, the microdrill is rotated in direction A and thrust forward to the work piece. All cutting edges are leading edges with respect to that direction of rotation.

The drill bits discussed above may be further modified by a surface decarburizing process. The surface decarburizing process can be done at a temperature from 600° C. to 1100° C. for 15 to 120 minutes. Surface decarburizing should take place in a controlled partial pressure of decarburizing gas, e.g., hydrogen, carbon dioxide, oxygen and other mixtures, with hydrogen being preferred, amid the general protective environment at the heat treating temperature. Surface decarburizing can preferably be done at approximately 800° C. for approximately 60 minutes in a mixture of argon and hydrogen.

Cemented carbide microdrills are generally made by pressing and sintering a mixture of powders of one or more metallic carbides and a smaller amount of metal such as cobalt to serve as a binder. Cemented carbides have a very high hardness and strength which makes it an advantageous material to use in the drilling applications described above. However, cemented carbides are also brittle. This can lead to chipping, especially at the outer corners of the primary cutting edges. Surface decarburizing the microdrills increases resistance of the cemented carbide to wear as discussed above. Accordingly, the surface decarburizing process in combination with the refined primary cutting edges further increases the resistance to chipping and wear of the microdrills according to the present invention.

The above description and drawings are only illustrative of preferred embodiments which achieve the objects, features and advantages of the present invention, and it is not intended that the present invention be limited thereto. For example, the modifications to the primary cutting edges illustrated on the microdrills of the present invention could advantageously be used on other drill bits not limited to microdrills or drills having split points. The modified cutting edges of the present invention could also be used on other types of rotating cutting tools. Furthermore, the process disclosed could additionally be used on other rotating cutting tools such as other types of drills, router bits, and milling cutters which can be used in producing holes in printed circuit boards and in other applications.

What is claimed as new and desired to be protected by Letters Patent of the U.S. is:

1. A drill comprising:
   a drill body having a cutting tip, an axis of symmetry, and a plurality of flutes wherein said flutes have a rake surface at said cutting tip;
   said cutting top comprising a plurality of side blades between said flutes and joined at a web, a plurality of flank surfaces extending from an outer diameter of said cutting tip to said axis of symmetry, and a plurality primary cutting edges at the intersection of said flank surfaces with said rake surfaces which have a plurality of outer surfaces;
   wherein said primary cutting edges include an angular surface formed on the forward end of said rake surfaces;
   wherein said primary cutting edges comprise a hardened layer formed from the outer surface of the drill.

2. A drill as in claim 1, wherein said hardened layer is approximately 0.0001 in thick.

3. A drill as in claim 2, wherein said hardened layer comprises eta phase, a double carbide of tungsten and cobalt, and tungsten carbide WC and cobalt metal.

4. A microdrill, comprising:
   a drill body having a cutting tip, an axis of symmetry, and a plurality of flutes wherein said flutes have a rake surface at said cutting tip;
   said cutting tip comprising a plurality of side blades between said flutes and joined at a web, a plurality of flank surfaces extending from an outer diameter of said cutting tip to said axis of symmetry, and a plurality primary cutting edges at the intersection of said flank surfaces with said rake surfaces which have a plurality of outer surfaces;
   wherein said primary cutting edges include an angular surface formed on the forward end of said rake surfaces;
   wherein said primary cutting edges comprise a hardened layer formed from the outer surface of the microdrill.

5. A drill as in claim 4, wherein said hardened layer is approximately 0.0001 in thick.

6. A drill as in claim 5, wherein said hardened layer comprised a eta phase, a double carbide of tungsten and cobalt, and tungsten carbide WC and cobalt metal.

7. A drill, comprising:
   a drill body having a cutting tip, an axis of symmetry, and a plurality of flutes wherein said flutes have a rake surface at said cutting tip;
   said cutting tip comprising a plurality of side blades between said flutes and joined at a web, a plurality of flank surfaces extending from an outer diameter of said cutting tip to said axis of symmetry, and a plurality primary cutting edges at the intersection of said flank surfaces with said rake surfaces;
   wherein said rake surface and said flank surface are positioned such that an extension of said rake surface intersects an extension of said flank surface at an intersection;
   wherein said primary cutting edges include an angular surface formed on the forward end of said rake surfaces;
   wherein said angular surface is located such that the length of said extension of said rake surface measured between said angular surface and said intersection is a first predetermined value and the length of said extension of said flank surface measured between said angular surface and said intersection is a second predetermined value;
   wherein said first and second predetermined values are equal.

8. A drill as in claim 7, wherein both said first and second predetermined values area at least approximately 0.0001 inches.

9. A microdrill, comprising:

a drill body having a cutting tip, an axis of symmetry, and a plurality of flutes wherein said flutes have a rake surface at said cutting tip;

said cutting tip comprising a plurality of side blades between said flutes and joined at a web, a plurality of flank surfaces extending from an outer diameter of said cutting tip to said axis of symmetry, and a plurality primary cutting edges at the intersection of said flank surfaces with said rake surfaces;

wherein said rake surface and said flank surface are positioned such that an extension of said rake surface intersect an extension of said flank surface at an intersection;

wherein said primary cutting edges include an angular surface formed on the forward end of said rake surfaces;

wherein said angular surface is located such that the length of said extension of said rake surface measured between said angular surface and said intersection is a first predetermined value and the length of said extension of said flank surface measured between said angular surface and said intersection is a second predetermined value;

wherein said first and second predetermined values are equal.

10. A drill as in claim 9, wherein both said first and second predetermined values are at least approximately 0.0001 inches.

* * * * *